United States Patent
Pytlarz et al.

(10) Patent No.: US 11,875,719 B2
(45) Date of Patent: Jan. 16, 2024

(54) METAMERIC STABILIZATION VIA CUSTOM VIEWER COLOR MATCHING FUNCTION

(71) Applicant: Dolby Laboratories Licensing Corporation, San Francisco, CA (US)

(72) Inventors: Jaclyn Anne Pytlarz, Santa Clara, CA (US); Elizabeth G. Pieri, Campbell, CA (US); Robin Atkins, Vancouver (CA)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 104 days.

(21) Appl. No.: 17/611,072

(22) PCT Filed: May 12, 2020

(86) PCT No.: PCT/US2020/032538
§ 371 (c)(1),
(2) Date: Nov. 12, 2021

(87) PCT Pub. No.: WO2020/232032
PCT Pub. Date: Nov. 19, 2020

(65) Prior Publication Data
US 2022/0327982 A1    Oct. 13, 2022

Related U.S. Application Data

(60) Provisional application No. 62/975,997, filed on Feb. 13, 2020, provisional application No. 62/846,893, filed on May 13, 2019.

(30) Foreign Application Priority Data

May 13, 2019 (EP) ..................... 19174068

(51) Int. Cl.
*G09G 3/20*    (2006.01)
*G09G 5/10*    (2006.01)
(Continued)

(52) U.S. Cl.
CPC ............. *G09G 3/2003* (2013.01); *G09G 5/10* (2013.01); *G09G 2320/0666* (2013.01);
(Continued)

(58) Field of Classification Search
CPC .......... G09G 3/2003; G09G 5/02; G09G 5/10; G09G 2320/0686; G09G 2320/0693;
(Continued)

(56) References Cited

U.S. PATENT DOCUMENTS 5,381,349 A    1/1995    Winter
7,126,718 B1    10/2006    Newman
(Continued)

FOREIGN PATENT DOCUMENTS

CN    108844633 B    9/2020
EP    3035014 A1    6/2016

OTHER PUBLICATIONS

Long To et al., "Psychophysical contrast calibration", Sep. 11, 2012, Vision Research, pp. 1524 (Year: 2013).*
(Continued)

*Primary Examiner* — Wesner Sajous

(57) ABSTRACT

Two corresponding color patches are displayed on two image displays until adjusted by a viewer to match visually to a common color. Two sets of code values rendered on the two corresponding color patches on the two image displays are identified. Two sets of tristimulus values for the viewer are determined based on the two sets of code values rendered on the two corresponding color patches on the two image displays. The viewer's color matching function are generated based on the two sets of tristimulus values. The
(Continued)

viewer's CMF is used in image rendering operations on a target image display.

22 Claims, 9 Drawing Sheets

(51) Int. Cl.
| | |
|---|---|
| *G09G 5/06* | (2006.01) |
| *H04N 1/60* | (2006.01) |
| *G09G 5/02* | (2006.01) |
| *H04N 5/57* | (2006.01) |
| *H04N 9/67* | (2023.01) |
| *H04N 9/69* | (2023.01) |
| *H04N 9/73* | (2023.01) |

(52) U.S. Cl.
CPC . *G09G 2320/0693* (2013.01); *G09G 2340/02* (2013.01); *G09G 2340/06* (2013.01); *G09G 2354/00* (2013.01)

(58) Field of Classification Search
CPC ....... G09G 2320/0666; G09G 2340/06; G09G 2340/02; G09G 2354/00; G09G 2320/00; G09G 2320/02; G09G 2320/0242; G09G 2320/0626; G09G 2320/066; G09G 2320/0673; G09G 2320/10; G09G 3/34; G09G 3/3413; G09G 2320/06; G09G 5/14; G09G 5/30; G01J 3/465; G01J 3/463; H04N 1/52; H04N 1/56; H04N 1/58; H04N 1/60; H04N 1/6027; H04N 1/6041; H04N 1/6077; H04N 5/57–5/58; H04N 9/3182; H04N 9/3188; H04N 9/44; H04N 9/64; H04N 9/67–9/69; H04N 9/73; H04N 9/77; H04N 23/86; H04N 23/84–23/88; G06F 3/048; G06F 3/1423; G06F 3/1446; G06F 3/1454
USPC ........................................................ 345/604
See application file for complete search history.

(56) References Cited

U.S. PATENT DOCUMENTS

| | | | |
|---|---|---|---|
| 7,134,091 B2 | 11/2006 | Dresevic | |
| 7,333,117 B2 | 2/2008 | Kim | |
| 7,710,432 B2 | 5/2010 | Edge | |
| 7,796,296 B2 | 9/2010 | Martinez | |
| 8,125,696 B2 | 2/2012 | Manabe | |
| 8,542,324 B2 | 9/2013 | Wang | |
| 8,730,254 B2 | 5/2014 | Shimbaru | |
| 2005/0128192 A1 | 6/2005 | Heintzman | |
| 2006/0012810 A1* | 1/2006 | Postle | G01J 3/462 358/1.9 |
| 2006/0290958 A1 | 12/2006 | Jang | |
| 2011/0026817 A1 | 2/2011 | Edge | |
| 2011/0026821 A1 | 2/2011 | Edge | |
| 2011/0148910 A1 | 6/2011 | Botzas | |
| 2011/0273495 A1* | 11/2011 | Ward | G09G 3/3426 345/694 |
| 2011/0305391 A1* | 12/2011 | Kunkel | H04N 1/6088 382/167 |
| 2013/0033528 A1* | 2/2013 | Sarkar | G09G 5/02 345/690 |
| 2013/0222412 A1* | 8/2013 | Pertierra | G01J 3/506 345/593 |
| 2014/0028697 A1 | 1/2014 | Kurtz | |
| 2014/0282285 A1 | 9/2014 | Sadhvani | |
| 2015/0350492 A1* | 12/2015 | Kurtz | H04N 9/3182 345/591 |
| 2017/0110089 A1 | 4/2017 | Douglas | |
| 2017/0249755 A1 | 8/2017 | Shih | |
| 2018/0082658 A1* | 3/2018 | Atkins | G09G 5/02 |
| 2019/0172415 A1* | 6/2019 | Davis | G06T 7/90 |
| 2020/0013151 A1* | 1/2020 | Atkins | G06T 5/009 |

OTHER PUBLICATIONS

Long To, et al "Psychophysical Contrast Calibration" Vision Research, vol. 90, Sep. 1, 2013, pp. 15-24.

Yamauchi, Y. et al "Metameric Matching and its Compensation with Individual Color Matching Functions" Journal of Vision, vol. 4, No. 11, Nov. 1, 2004, pp. 93.

* cited by examiner

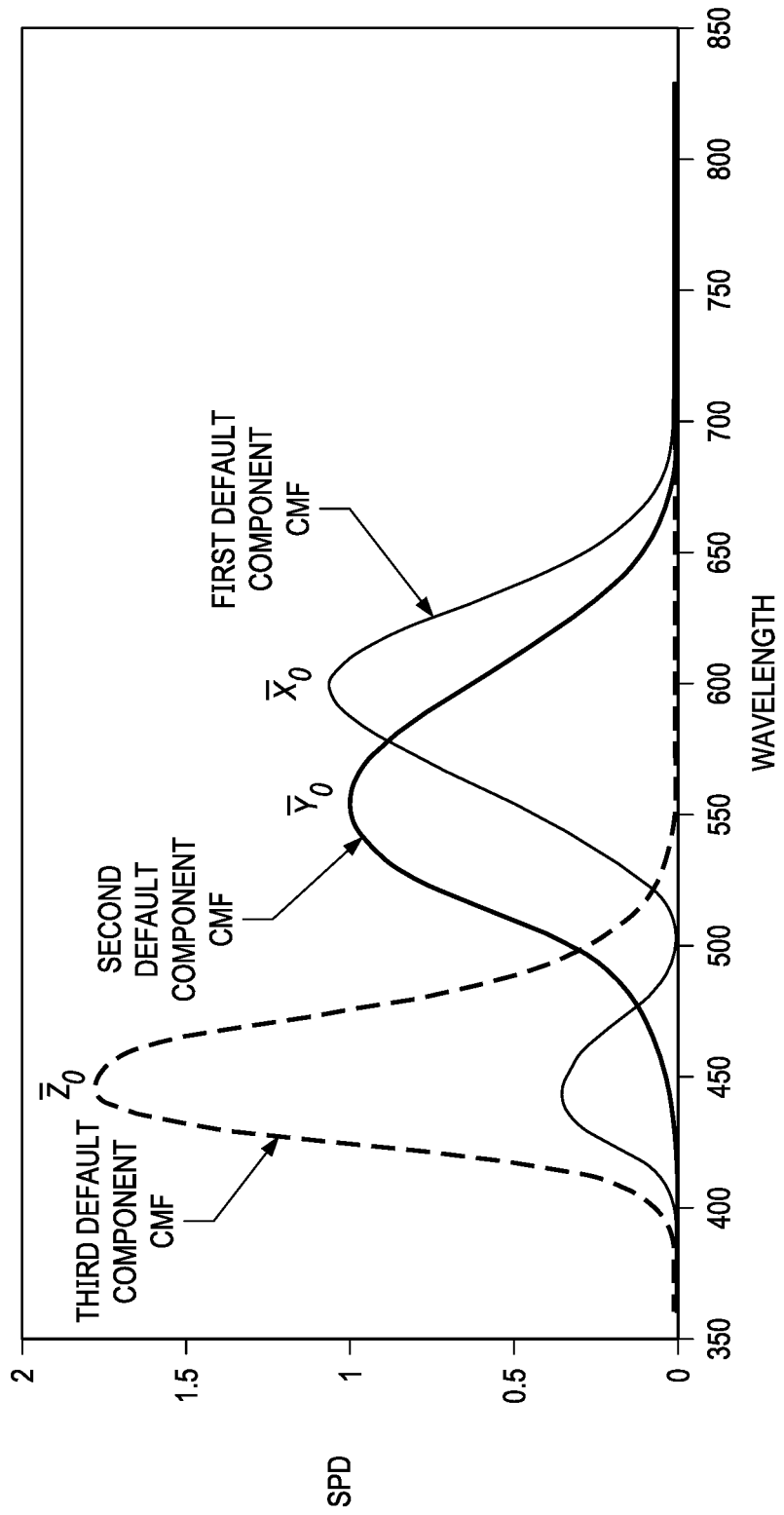

METAMERIC STABILIZATION VIA CUSTOM VIEWER COLOR MATCHING FUNCTION

CROSS-REFERENCE TO RELATED APPLICATIONS

This application claims the benefit of priority to U.S. Provisional Patent Application No. 62/975,997, filed Feb. 13, 2020, U.S. Provisional Patent Application No. 62/846,893, filed May 13, 2019, and European Patent Application No. 19174068.7, filed May 13, 2019, all of which are hereby incorporated by reference.

TECHNOLOGY

The present invention relates generally to image rendering, and in particular, to metameric stabilization via custom viewer color matching function.

BACKGROUND

Display calibration typically measures display characteristics of an image display and adjusts the image display to conform the display characteristics to some expected values in reference to a "standard observer."

However, age, gender, and ethnicity (among other factors) are known to affect color vision. Every observer has different individual sensitivities to different light wavelengths in the visible spectrum of light to the human visual system (HVS). As display primaries implemented in image displays become narrower in terms of light wavelengths in the visible spectrum of light, it becomes more likely that different observers viewing the same composition rendered with the same display primaries in an image see apparently different colors in the same image. The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which:

FIG. 3B and FIG. 3C illustrate example color matching functions;

DESCRIPTION OF EXAMPLE EMBODIMENTS

Figure 1:
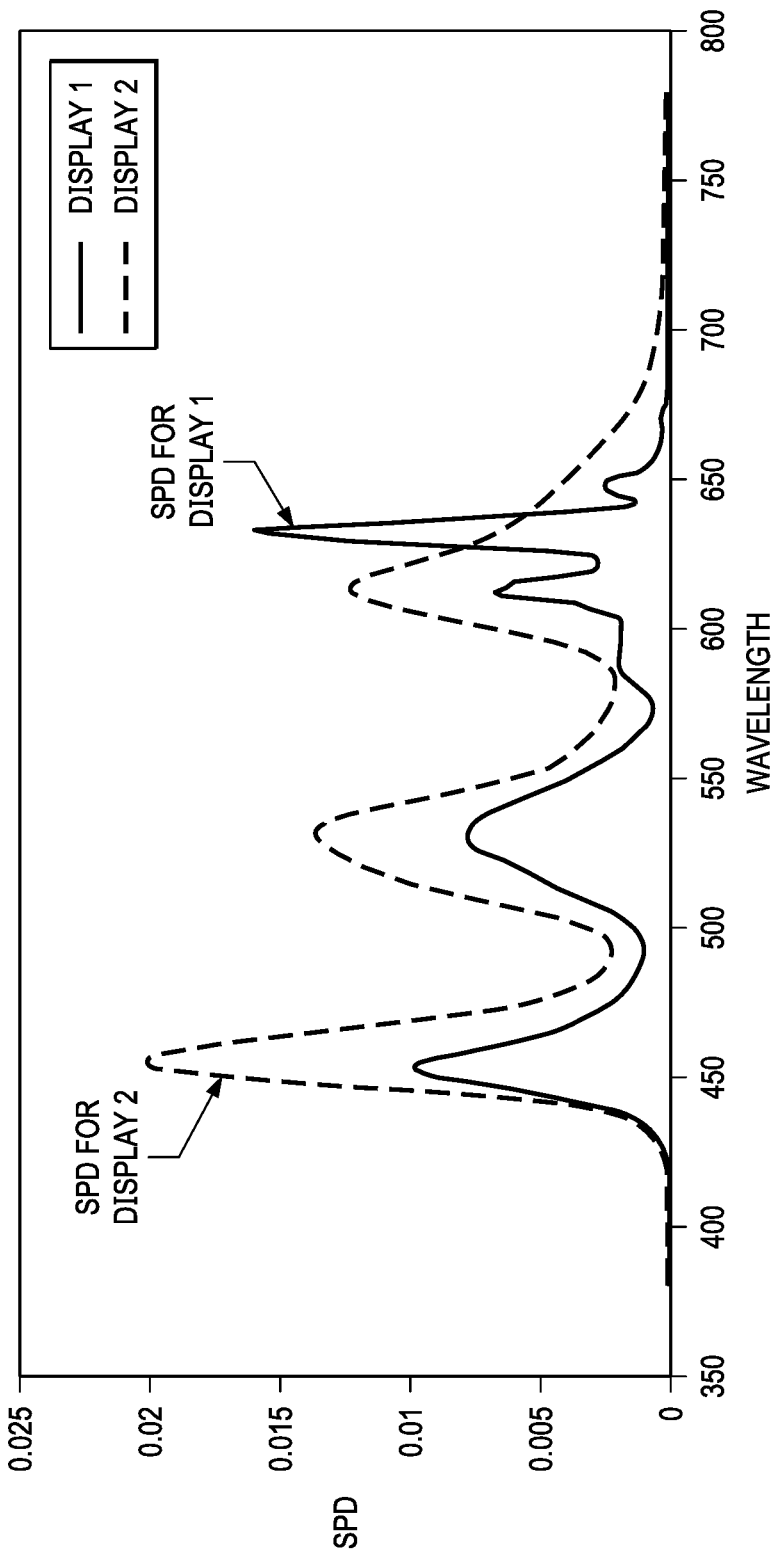
FIG. 1 illustrates example spectral power distributions (SPDs) of image displays.

Example embodiments, which relate to metameric stabilization via custom viewer color matching function, are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Example embodiments are described herein according to the following outline:
1. GENERAL OVERVIEW
2. COLOR MATCHING FUNCTIONS FOR INDIVIDUAL VIEWERS
3. TRANSFORMATION MATRIX FOR TARGET DISPLAYS
4. EXAMPLE PROCESS FLOWS
5. IMPLEMENTATION MECHANISMS—HARDWARE OVERVIEW
6. EQUIVALENTS, EXTENSIONS, ALTERNATIVES AND MISCELLANEOUS 1. General Overview This overview presents a basic description of some aspects of an example embodiment of the present invention. It should be noted that this overview is not an extensive or exhaustive summary of aspects of the example embodiment. Moreover, it should be noted that this overview is not intended to be understood as identifying any particularly significant aspects or elements of the example embodiment, nor as delineating any scope of the example embodiment in particular, nor the invention in general. This overview merely presents some concepts that relate to the example embodiment in a condensed and simplified format, and should be understood as merely a conceptual prelude to a more detailed description of example embodiments that follows below. Note that, although separate embodiments are discussed herein, any combination of embodiments and/or partial embodiments discussed herein may be combined to form further embodiments.

Techniques as described herein can be used to customize an image display differently for different viewers, taking into account their respective perceptions of colors and/or personal color preferences. Example personal color preferences may include, without limitation, preferred color saturation levels for a given color. Additionally, optionally or alternatively, what constitutes a color such as "yellow" may also be dependent on an individual viewer's personal color preferences. An individual color matching function (denoted as "ColorID") may be generated for an individual viewer and applied to adjust an image display to the individual viewer's unique vision characteristics (e.g., color perceptions, different sensitivities to different parts of the visible light spectrum, etc.).

Different individual color matching functions (or ColorIDs) may be generated for different individual viewers and applied to adjust the same or different image displays operated by these different viewers so the different viewers can see or visually perceive apparent colors consistent with the artist/creative intent in images.

This solves the problem of "baking the standard observer into" (or using a generic profile or setting in) image displays, which would cause inaccurate and variant color representations or perceptions to many if not all viewers, especially if the image displays use display primaries of relatively narrow light wavelengths and thus may be prone to metameric instability.

Colors in images such as professionally produced video/image content are often used to convey specific artistic/creative intent to viewers of the images. To maintain the artistic/creative intent in rendering the images, the unique color vision of each individual viewer (e.g., an end user, a consumer, etc.) may be modeled and identified through a corresponding color matching function (or color perception identifier), which in turn can be used to generate a target display color transformation matrix for a target image display. The target display color transformation matrix can be applied in image rendering operations of the target image display so that each such individual viewer sees relatively consistent and accurate colors as represented with the specific artistic/creative intent. Some or all of an individual viewer's color matching function (or ColorID) and target display specific transformation matrixes for one or more target displays can be stored in one or more color vision configuration files with one or more of an image display device, a mobile device, a computer server, a set-top box, etc., in a way similar to how display characteristics of an image display may be stored (e.g., in memory, in cache, in a persistent store operating with the image display, etc.).

There is no requirement for a metamerically stable image display to be used for performing color patch matching operations. Techniques as described herein can be implemented with any image displays including but not limited to image displays with metameric instability. Two or more image displays with different SPDs can be used to generate a relatively accurate color matching function characterizing any individual viewer's specific color vision.

Under these techniques, there is no need to calibrate (e.g., using a standard observer model, etc.) an image display in reference to a metamerically stable image display. Hence, the techniques as described herein can be applied with relatively low complexity/cost and relatively high efficiency/accuracy to a large population of individual viewers, a broad range of image displays and a wide variety of image rendering operational scenarios.

As used herein, image displays with metameric instability refers to image displays (e.g., with display primaries of relatively narrow light wavelength ranges, etc.) which, when rendering a color, are likely to cause different viewers to see or visually perceive different colors with the same rendered color. An individual viewer's color matching function may be found or determined under techniques as described herein with relatively high efficiency and accuracy by exploiting the metameric instability of these image displays.

In some operational scenarios, two image displays with metameric instability may be used to characterize the individual viewer's color vision or determine the individual viewer's color matching function. To help converge to a well-behaved solution/result in determining the individual viewer's color matching function, the two image displays may be specifically selected to be significantly different in their respective SPDs.

An SPD of an image display as described herein can be determined (e.g., in advance, based on physical/optical properties of light sources, optical stacks, light modulators and/or color filters, based on measurements in factory of an individual device or of a batch of a corresponding device model, etc.). For example, for a color (as represented by a pixel value of an image, etc.) displayed on the image display, a spectral composition or SPD of displayed light (or physical light) used/generated by the image display to render the color (or the pixel value) on the image display can be measured.

As used herein, displayed light or physical light visible to an individual viewer—which is generated by an image display to render a color represented by a pixel value of an image or a color patch—refers to light that reaches, or is determined/predicted to reach, the individual viewer from a corresponding pixel (with the pixel value) of the image display. In some operational scenarios, the displayed light may be light that is first generated by a light source (e.g., a backlight unit, with a light source SPD, etc.) of the image display and then transmitted/filtered through light modulators and color filters of the image display toward the individual viewer with a displayed light SPD.

Two or more corresponding color patches may be respectively rendered and displayed on two or more image displays. A color patch may, but is not limited to, be a solid or non-solid test image portion rendered with a single pixel value (e.g., in the foreground of the test image portion, etc.). In some operational scenarios, the two or more corresponding color patches respectively displayed on the two or more image displays can each be simple solid color blocks that are as similar as possible in size, backgrounds, shape, texture, etc.

Initially, each color patch in the corresponding color patches respectively displayed by the image displays may display colors representing the same or similar initial pixel value (across all the two or more image displays) to an individual viewer (or observer). At this point, because of differences in sensitivities to different visible light wavelengths employed for image rendering in the two or more image displays, the individual viewer may see apparently different colors in color blocks rendered/displayed with the same or similar pixel value on the different image displays.

The individual viewer is asked to review all the color patches and make color adjustments (e.g., adjustments for hue, brightness, saturation; adjustments for red, green, blue; other color adjustments; etc.) to at least one or more of these color patches until the colors of all the color patches on all the two or more image displays are perceived to be color matched to the individual viewer. The color adjustments can be accumulated and used to change the underlying pixel value that drives the rendering of the color patches to respective pixel values for the image displays.

In the case of two image displays (e.g., only, etc.) being used to derive the individual viewer's color matching function, a color patch on one of the two image displays may be adjusted by the individual viewer to match the color of the adjusted color patch to the color of the other non-adjusted color patch on the other image display of the two image displays.

When the colors of the corresponding color patches match with one another, different pixel values that drive the rendering of these corresponding color patches may be determined and used to derive different SPDs on different image displays in the two or more image displays. These different SPDs on the different image displays produce the same perceptual color for the individual viewer.

The foregoing color matching operations can be repeatedly, recursively, iteratively and/or concurrently performed with the two or more image displays with color patches driven by an initially identical pixel value in a plurality of initial pixel values for a plurality of different colors. For example, the individual viewer may start with green color patches driven by a green pixel value as an initially identical pixel value, followed by yellow color patches driven by a yellow pixel value as an initially identical pixel value, followed by red color patches driven by a red pixel value as an initially identical pixel value, and so on.

As a result, multiple sets of measurements may be obtained using multiple initial pixel values, with each set in the multiple sets of measurements including different SPDs for different image displays in the two or more image displays.

These multiple sets of measurements can be used to find, estimate and/or predict (e.g., through linear regression, etc.) a corresponding color matching function for the individual viewer that would have created these matches as indicated in the multiple sets of measurements.

The individual viewer's color matching function then becomes a color perception identifier (or "ColorID") for the individual viewer. The individual viewer's color matching function can be used by any image display in a wide variety of image displays (including but not limited to image displays identical or similar to those used in measurements) to make color adjustments in image rendering operations to produce colors that match artistic/creative intent as represented in images received for rendering.

More specifically, the individual viewer's color matching function as indicated in the ColorID can be used along with the spectral power distribution of a target image display to determine color adjustments (e.g., by applying delta adjustments to pixel values or digital drive values, etc.) to optimize viewing experiences for the individual viewer (or consumer) ensuring the highest or relatively high consistency among different image displays.

Additionally, optionally or alternatively, in multi-viewer operational scenarios, multiple color matching functions as indicated by multiple viewers' ColorIDs can be used to derive a group value such as an average (e.g., an average CMF, a weighted average CMF, etc.) among the multiple viewers. The group value may be used to prioritize or generate color adjustments for the multiple viewers to achieve a relatively high consistency of colors.

In some example embodiments, mechanisms as described herein form a part of a media processing system, including but not limited to any of: cloud-based server, mobile device, virtual reality system, augmented reality system, head up display, helmet mounted display, CAVE-type system, wall-sized display, video game device, display, media player, media server, media production system, camera systems, home-based systems, communication devices, video processing system, video codec system, studio system, streaming server, cloud-based content service system, a handheld device, game machine, television, cinema display, laptop computer, netbook computer, tablet computer, cellular radiotelephone, electronic book reader, point of sale terminal, desktop computer, computer workstation, computer server, computer kiosk, or various other kinds of terminals and media processing units.

Various modifications to the preferred embodiments and the generic principles and features described herein will be readily apparent to those skilled in the art. Thus, the disclosure is not intended to be limited to the embodiments shown, but is to be accorded the widest scope consistent with the principles and features described herein.

2. Color Matching Functions for Individual Viewers

Figure 4A:
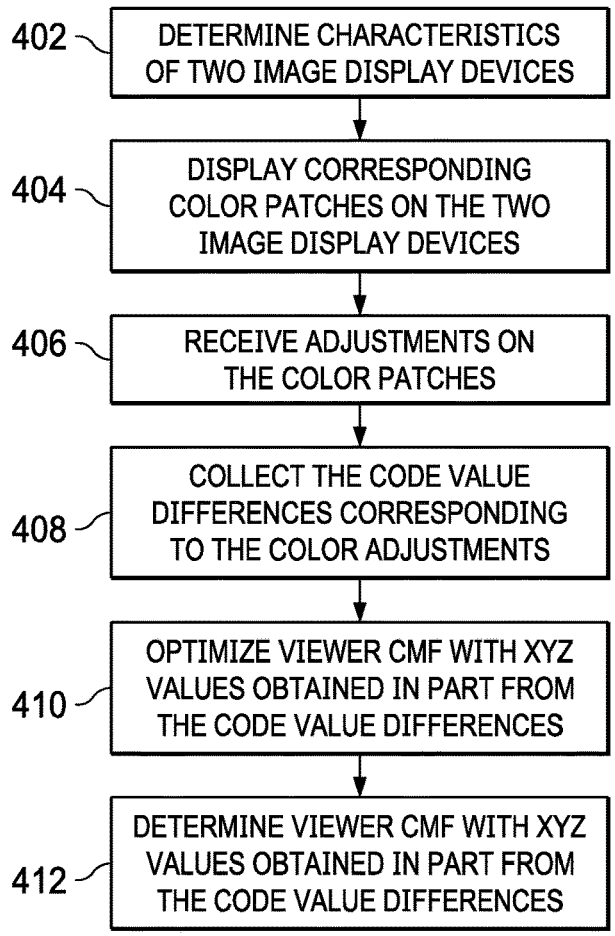
FIG. 4A through FIG. 4D illustrate example process flows.

FIG. 4A illustrates an example process flow (e.g., for calculating or determining color matching functions for individual viewer(s), etc.), which may be implemented or performed at least in part with one or more computing devices including but not limited image displays with different metameric instabilities, image displays with different SPDs for light sources included or used in the image displays, computing devices operating in conjunction with image displays, etc.

By way of illustration but not limitation, two image displays with different SPD characteristics (e.g., different SPD characteristics of light sources used in the image displays, etc.) may be used to perform some or all of the process flow of FIG. 4A.

Figure 2A:
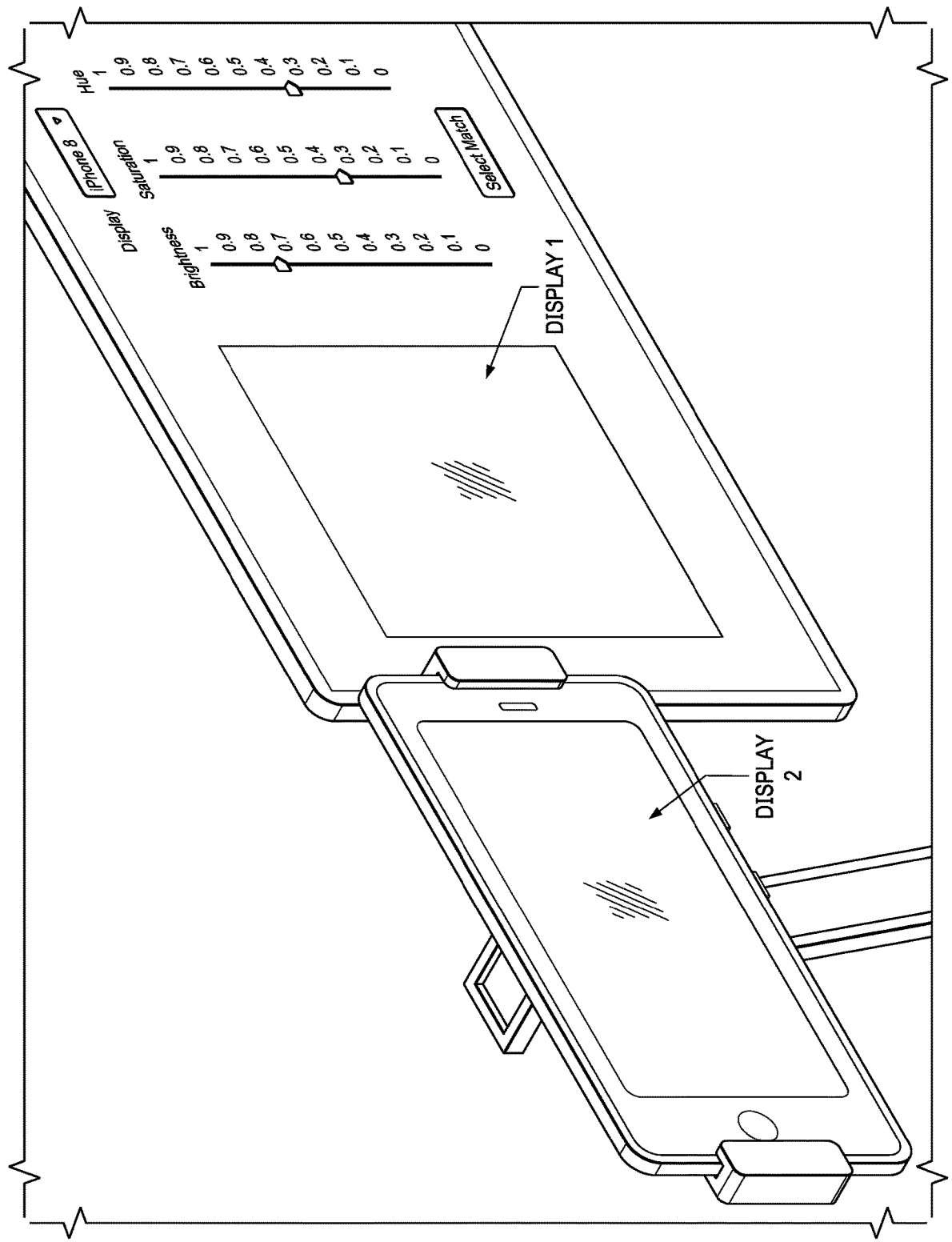
FIG. 2A and FIG. 2B illustrate example image displays used to match colors.
Figure 2B:
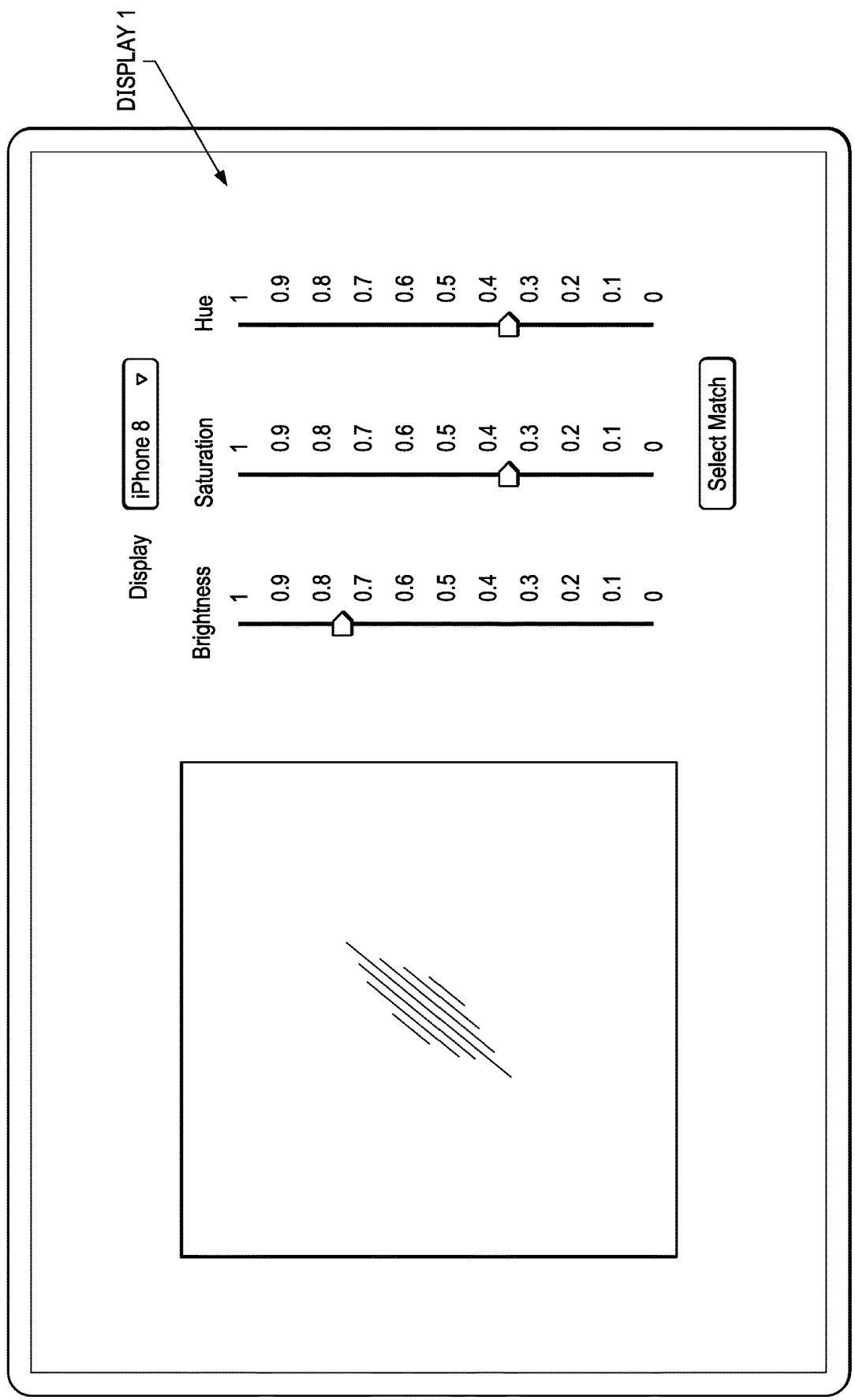

FIG. 1 illustrates example SPDs (denoted as "Display 1" and "Display 2" respectively) with metameric instability. Each of the SPDs can be determined as physical, optical and/or display characteristics of a corresponding image display empirically, through light spectral measurements, etc. The SPDs of the two image displays may be selected to be very different. In an example, one of the two image displays may be LCD, whereas the other of the two image displays may be OLED. In another example, one of the two image display may be a specific iPhone model, whereas the other of the two image displays may be a specific Android image display. As shown, the SPD for Display 1 is different (e.g., in terms of shapes, magnitudes and/or widths of SPDs, etc.) from the SPD for Display 2. Each of the SPDs comprises narrow spikes that can cause metameric failures (e.g., different perceived colors for the same color patch, etc.) among different individual viewers and generate different color perceptions among different image displays. FIG. 2A illustrates two example image displays used to match colors. FIG. 2B illustrates an example image display with color adjustment controls (e.g., as a part of user interface, etc.) that can be operated by a viewer to match colors between the image display and another image display.

Block 402 comprises identifying (e.g., determining, measuring, deriving, etc.) physical/optical/display characteristics of the two image displays. Example physical/optical/display characteristics may include, but are not necessarily limited to only, one or more of: SPD, maximum luminance, minimum luminance, gamma function, etc. A first set of (physical/optical/display) characteristics may be that of a first image display in the two image displays, whereas a second set of (physical/optical/display) characteristics may be that of a second image display in the two image displays. A set of characteristics as described herein may be used to derive a displayed colorimetry from a pixel value (or code value) of a displayed pixel, a displayed test image pattern, a displayed color block, a displayed color patch, etc.

Block 404 comprising creating corresponding color patches on the two image displays ("Display 1" and "Display 2" as shown in FIG. 2A). These two color patches can be displayed relatively similar in pattern, size (e.g., in terms of physical dimensions, physical sizes, etc.), background, other visual factors, etc.

Block 406 comprises receiving color adjustments of an individual viewer (or user) performed on one or more of the corresponding color patches rendered/displayed by one or more of the two image displays. In some operational scenarios, the individual viewer can use graphic user interface (GUI) controls (e.g., brightness, saturation, hue, etc.) to perform color adjustments on (e.g., only, etc.) one of the two corresponding color patches on (e.g., only, etc.) one of the two image displays until the color adjusted color patch of the two corresponding color patches visually matches, as perceived by the individual viewer, the other color patch (of the two corresponding color patches) on which the individual viewer may or may not perform any color adjustments.

Any color adjustments made by an individual viewer on a color patch as described herein may be represented as code value differences (e.g., deltas, value changes, etc.) to an initial pixel value used to drive rendering/displaying the color patch.

To obtain the individual viewer's color matching function, multiple sets of two corresponding color patches generated from multiple initial pixel values representing multiple testing colors may be displayed, color adjusted and/or color matched in block 406. These multiple testing colors may represent some or all of: a set of red, green, blue, white, a set of non-RGB colors with or without the color white, a set of three or more primary colors of a color space, a set of non-primary colors, a combination of any two of the foregoing, etc. Additional sets of two corresponding color patches corresponding to additional colors may also be displayed, color adjusted and/or color matched in block 406 to improve estimation/prediction of the individual viewer's color matching function. Any, some or all colors to be displayed in color patches of image displays may be specifically selected so that the image displays have sufficient room for, or support, color adjustments and color reproduction for the specifically selected color(s). In other words, colors displayed on the color patches, as adjusted by the viewer, need to be reproducible on each of the image displays. Additionally, optionally or alternatively, simply repeating the existing sets of color patches and averaging measurement results from these repetitive measurements also tends to improve reliability and confidence level of the resultant individual viewer's color matching function.

Block 408 comprises collecting the code value differences corresponding to the color adjustments to generate a new pixel value for any color patch on which the color adjustments have been made as part of matching the two corresponding color patches and converting to new pixel value to an SPD of displayed light visually perceived by the individual viewer.

Figure 3A:
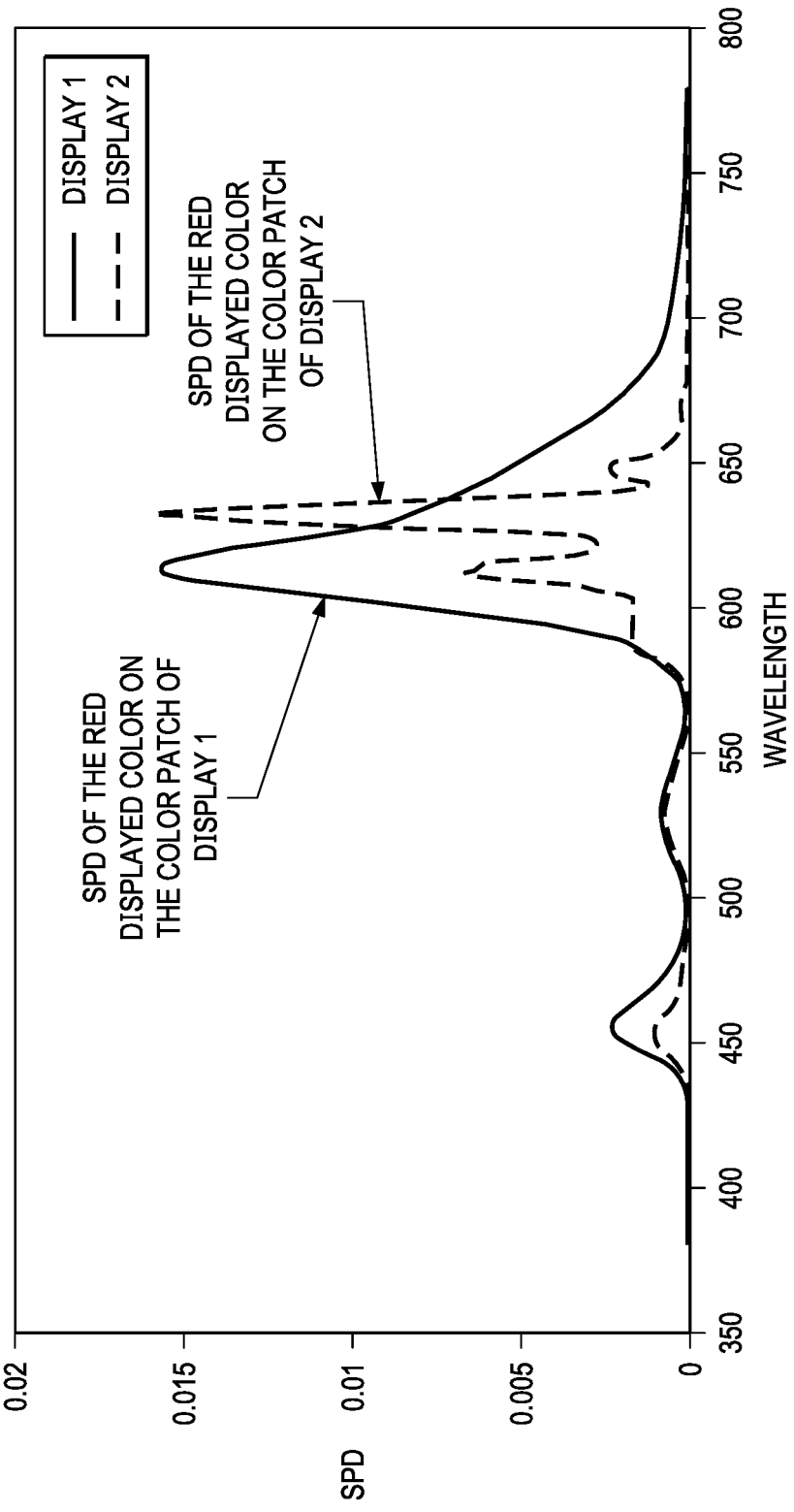
FIG. 3A illustrates example SPDs of displayed light on corresponding color patches.

For example, the two corresponding color patches on the two image displays may be used to display red colors. After the two corresponding color patches are color matched, the pixel value (or code value) for the color patch (red) on Display 1 may be [0.9, 0.1,0.1] represented in a non-linear RGB color space such as a gamma RGB color space. This pixel value represented in the non-linear RGB color space may be converted to a pixel value represented in a linear RGB color space using a gamma-to-linear conversion (e.g., an electro-optic transfer function for Display 1, etc.). The pixel value represented in the linear color space may represent, or scale with, linear intensity values for color components (e.g., RGB color components, primary colors, etc.) of the linear color space. The linear intensity values for the color components (or primary colors) of the linear color space may then be converted to SPDs of the color components (or primary colors) and then superimposed/summed into an overall (e.g., weighted with the linear intensity values, etc.) SPD of the displayed light represented in the color patch on Display 1 using the linear intensity values as weight factors, as illustrated in FIG. 3A.

The foregoing procedure to derive the overall SPD of the displayed light represented in the color patch on Display 1 may be repeated for Display 2 to derive an overall (e.g., weighted with applicable linear intensity values, etc.) SPD of the displayed light represented in the color patch on Display 2 using the applicable linear intensity values as weight factors, as illustrated in FIG. 3A.

Additionally, optionally or alternatively, the foregoing operations that derive the overall SPDs of the red displayed light on the two corresponding (red) color patches on the two image displays may be repeated for one or more other test colors (e.g., blue, green, white, etc.) to derive overall SPDs of the other (e.g., blue, green, white, etc.) color displayed light on other corresponding (e.g., blue, green, white, etc.) color patches on the two image displays.

Block 410 comprises optimizing the individual viewer's color matching function so that first tristimulus (e.g., XYZ, LMS, etc.) values (as computed for the individual viewer's color vision) from a first color patch in a set of two corresponding color patches match second tristimulus (e.g., XYZ, LMS, etc.) values (as computed for the individual viewer's color vision) from a second (or the other) color patch in the set of two corresponding color patches after the color patches in the set have been color matched by the individual viewer.

What color the individual viewer (or observer) is seeing (e.g., with color patches as described herein, etc.), as represented by tristimulus (e.g., XYZ, LMS, etc.) values, can be calculated as an integration of the individual viewer's cone vision with a light spectrum of displayed light, as follows:

$$X_{1,red} = \int \bar{x} * SPD_{Display1_{red}} \qquad (1\text{-}1)$$

$$Y_{1,red} = \int \bar{y} * SPD_{Display1_{red}} \qquad (1\text{-}2)$$

$$Z_{1,red} = \int \bar{z} * SPD_{Display1_{red}} \qquad (1\text{-}3)$$

$$X_{2,red} = \int \bar{x} * SPD_{Display2_{red}} \qquad (2\text{-}1)$$

$$Y_{2,red} = \int \bar{y} * SPD_{Display2_{red}} \qquad (2\text{-}2)$$

$$Z_{2,red} = \int \bar{z} * SPD_{Display2_{red}} \qquad (2\text{-}3)$$

where $\bar{x}$, $\bar{y}$, $\bar{z}$ denote three component color matching functions in the individual viewer's color matching function, respectively; $SPD_{Display1_{red}}$, $SPD_{Display2\_red}$ denote two SPDs of the two image displays (Display 1 and Display 2), respectively; $X_{1,red}$, $Y_{1,red}$, $Z_{1,red}$ denote tristimulus values of the red color patch displayed on the first image display (Display 1); $X_2$, red, $Y_2$, red, $Z_2$, red denote tristimulus values of the red color patch displayed on the second image display (Display 2).

Since the individual viewer has made a visual color match between the two color patches in the set, the tristimulus (e.g., XYZ, LMS, etc.) values as determined for one color patch (e.g., on Display 1, etc.) in the set of two corresponding color patches should match or closely approximate the tristimulus (e.g., XYZ, LMS, etc.) values as determined for the other color patch (e.g., on Display 2, etc.) in the set of two corresponding color patches.

Thus, the individual viewer's color matching function, or the component color matching functions $\bar{x}$, $\bar{y}$, $\bar{z}$ therein, may be estimated (e.g., predicted, approximated, generated, etc.) as a (e.g., multi-dimensional, overall, etc.) solution to an optimization/minimization problem that minimizes an overall estimation error/difference (e.g., an overall prediction error/difference, an overall approximation error/difference, an overall error/difference metric as computed with an error, difference or objective function, an overall noise, etc.) in matching tristimulus (e.g., XYZ, LMS, etc.) values (e.g., in expressions (1) and (2) above, etc.) for each set in all sets of two corresponding color patches (each set comprising a color patch on Display 1 and another color patch on Display 2) from which measurements, color adjustments and/or color matching have been made by the individual viewer.

Figure 3B:
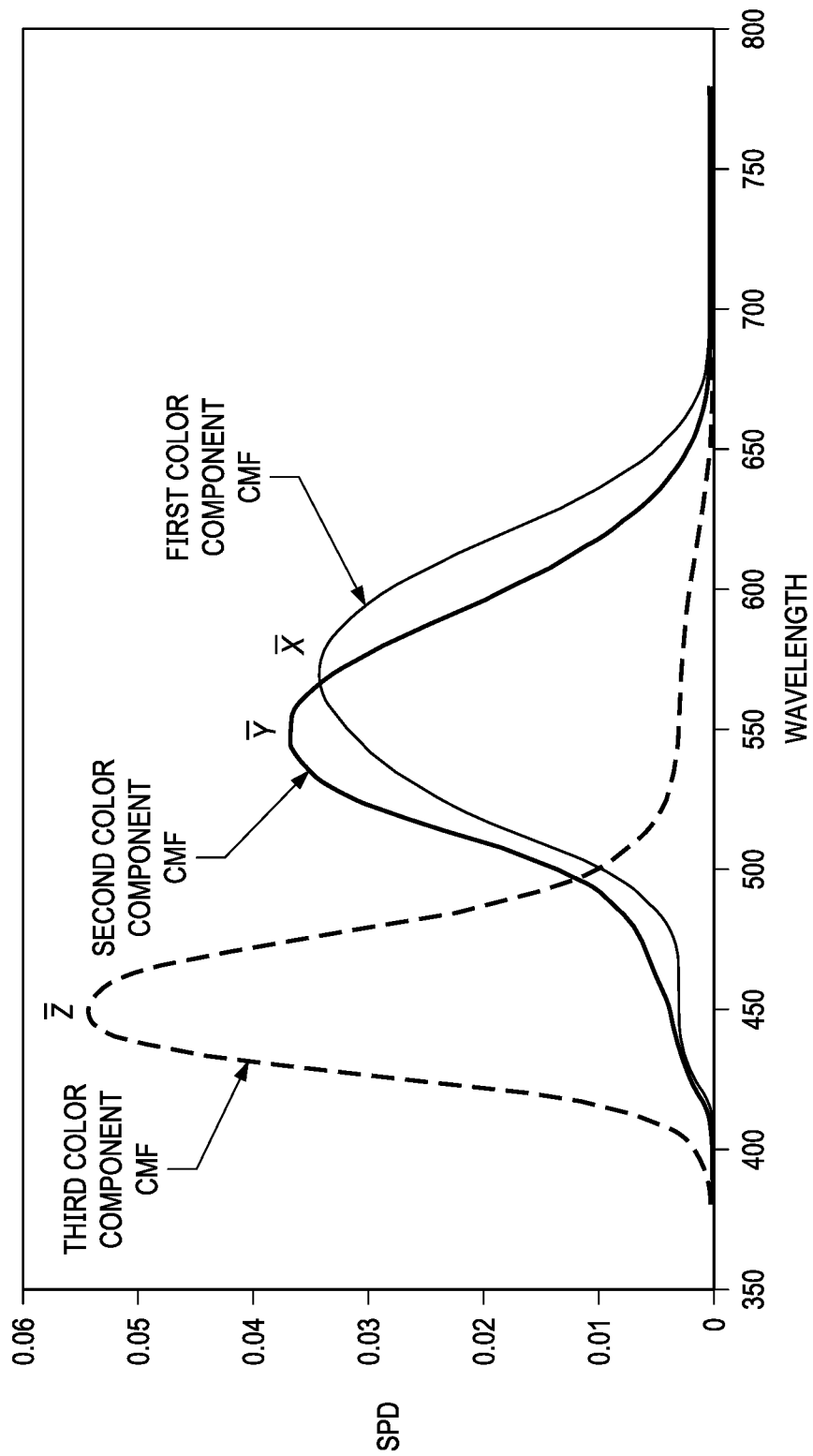

The resultant (e.g., estimated, predicted, optimized, etc.) individual viewer's color matching function (412), or the component color matching functions $\bar{x}$, $\bar{y}$, $\bar{z}$ therein as illustrated in FIG. 3B, describe the individual viewer's cone sensitivity or cone vision.

In some operational scenarios, it may be helpful to start with an initial CMF (e.g., a default CMF, a standard CMF, CMF 1931 with a 2 degree observer, etc.), as illustrated in FIG. 3C, to calculate tristimulus (e.g., XYZ, LMS, etc.) values. Then, iterative function adjustment operations (e.g., shift, squeeze, scale, etc.) can be performed starting with the initial CMF until two sets of tristimulus (e.g., XYZ, LMS, etc.) values computed for a set of two corresponding (post-color-matching) color patches match or closely approximate each other.

Any combination of one or more of a wide variety of optimization functions (e.g., objective functions, error functions, linear regression, polynomial regression, non-linear regression, least squares, weighted, unweightes, Bayesian, steepest descent, gradient descent, etc.) can be used to compute an overall error/difference in the optimization problem to determine the individual viewer's color matching function (412).

In some operational scenarios, an optimization function may comprise (a) a first part (e.g., a first term, a first factor, etc.) that can be used to choose or select a CMF that minimizes the difference between tristimulus (e.g., XYZ, LMS, etc.) values of each set of two corresponding color patches on the two image displays as viewed by the individual viewer and (2) a second part (e.g., a first term, a first factor, etc.) that can be used to choose or select a CMF that minimizes the difference between tristimulus (e.g., XYZ, LMS, etc.) values of the individual viewer and a standard observer. In these operational scenarios, significantly less weight may be given to the second part that minimizes the difference between the individual viewer and the standard observer. This relatively small weighting towards the standard observer may serve as a regularization term in the optimization problem and ensure that relatively slight errors in measurement do not lead to unrealistic optimization results/solutions.

3. Transformation Matrix for Target Displays

Figure 4B:
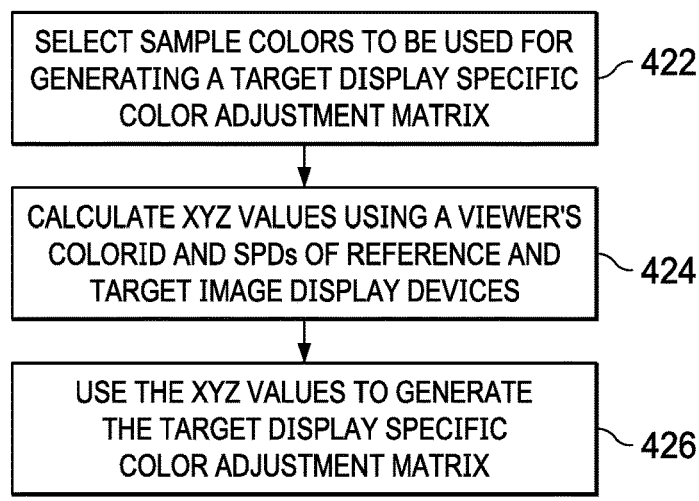

FIG. 4B illustrates an example process flow (e.g., for calculating or determining color matching functions for individual viewer(s), etc.), which may be implemented or performed at least in part with one or more computing devices including but not limited image displays with different metameric instabilities, image displays with different SPDs for light sources included or used in the image displays, computing devices operating in conjunction with image displays, etc.

The individual viewer's CMF may be used as the individual viewer's ColorID to gain or achieve better or relatively high consistency across different image displays by "normalizing" these different image displays to a reference image display (e.g., with metameric stability, etc.) based on the individual viewer's ColorID. What the individual viewer sees on the reference image display can be displayed on the individual viewer's target image display by performing target display specific color adjustment operations based on a transformation matrix generated based at least in part on the individual viewer's CMF and SPDs of the reference and target image displays.

In some operational scenarios, the reference image display may, but is not limited to, be a standard metameric stable image display, a standard CRT display, a reference display for which pixel values or code values are represented in images, and so forth. An SPD of the reference image display (e.g., a standard CRT display or the like, a standard DPI display, a display with xenon light source(s), a display with D65 light source(s), etc.) can be determined (e.g., empirically, through light spectral measurements, based on a standard-based and/or proprietary specification, etc.). To gain consistency between different image displays, an SPD (and/or display characteristics) of a target image display on which the individual viewer is to view image/video content from received images are first determined (e.g., empirically, through light spectral measurements, based on a standard-based and/or proprietary specification, etc.) along with the individual viewer's ColorID (e.g., using a process flow as illustrated in FIG. 4A, etc.).

The individual viewer's CMF (or ColorID) can then be used to generate a target display color transformation, which can be used to map reference tristimulus values derived from the individual viewer's CMF and a reference SPD of displayed light (deemed to be) rendered by a reference image display device for a given color (e.g., as represented by a pixel value or a code value in a received image) into tristimulus values derived from the individual viewer's CMF and a target SPD of displayed light to be rendered by a target image display device for the given color.

The target display color transformation may be represented as a 3×3 matrix and used to make target display specific adjustments for the target image display. As described herein, it should be noted that a 3×3 matrix is just one example for implemeting a target display color transformation. In other embodiments, a three-dimensional lookup table (3D LUT) or other more or less complex processing steps or constructs may be used to implement a target display color transformation as described herein. Example target display specific adjustments for the target image display may include, but are not necessarily limited to only, one or more of: mapping reference pixel values as represented in a received image for the reference image display to target pixel values to be rendered by the target image display, generating target display specific digital drive values from reference pixel values as represented in a received image for the reference image display, etc.

Block 422 comprises selecting or choosing a set of sample colors that are to be used to optimize the 3×3 matrix (or any other constructs or processing steps implementing the target display color transformation). Sample colors may be selected or chosen from a wide variety of colors mutually supported by the reference image display and the target image display. In some operational scenarios, the set of (e.g., one or more, two or more, three or more, etc.) sample colors can comprise one or more saturated colors and the color white (e.g., as represented by a white point in a color gamut supported by the reference or target image display, etc.).

Block 424 comprises calculating tristimulus (e.g., XYZ, LMS, etc.) values using the ColorID and the SPD (and the display characteristics) of the reference image display (or light source used in the reference image display).

For example, for each sample color in the set of sample colors as represented by a pixel value or a code value (which is availble to be represented in a received image, in a test image, a linear or non-linear pixel value or code value, etc.), the individual viewer's (would be) tristimulus XYZ values (denoted as $X_2$, $Y_2$, $Z_2$) as the individual viewer would view/perceive the sample color on the reference image display may be computed using the pixel value (or code value), the SPD (and/or the display characteristics such as EOTF function, etc.) of the reference image display, the individual viewer's ColorID, etc.

Likewise, for the same sample color, the individual viewer's (would be) tristimulus XYZ values (denoted as $X_1$, $Y_1$, $Z_1$) as the individual viewer would view/perceive the sample color on the target image display may be computed using the pixel value (or code value), the SPD (and/or the display characteristics such as EOTF function, etc.) of the target image display, the individual viewer's ColorID, etc.

Block 426 comprises finding or generating the 3×3 matrix (denoted as "b"; or any other constructs or processing steps implementing) that will yield equal or closely approximate tristimulus (e.g., XYZ, LMS, etc.) values between the reference image display and the target image display for the individual viewer for each of some or all sample colors in the set of sample colors.

The 3×3 matrix (or any other constructs or processing steps implementing the target display color transformation) may be generated or calculated as a solution to an optimization problem that minimizes an overall estimation error/difference (e.g., an overall prediction error/difference, an overall approximation error/difference, an overall error/difference metric as computed with an error, difference or objective function, etc.) in matching tristimulus (e.g., XYZ, LMS, etc.) values for each sample color in the set of sample colors between the reference and target image displays with the individual viewer's ColorID.

The 3×3 matrix (b) may be solved with a matrix solver/method/algorithm using a combination of one or more of a wide variety of matrix solvers/methods/algorithms, as follows:

$$\begin{matrix} X1 \\ Y1 \\ Z1 \end{matrix} = b * \begin{matrix} X2 \\ Y2 \\ Z2 \end{matrix} \quad (3)$$

This matrix b (represented in a linear color space) can then be applied to image rendering operations performed with the target image display to ensure what colors the individual viewer would see on the reference image display is the same as what colors the individual viewer sees on the target image display.

In some operational scenarios, a transformation matrix as described herein may operate on image data in a color space such as an LMS color space, a non-LMS color space, a linear color space, etc. If received images are represented in a different color space, the received images may be converted from an input color space into the color space in which the transformation matrix operates and converted back to the same input color space, or to a display color space for image rendering. Additionally, optionally or alternatively, in various embodiments, one or more transfer functions may be used convert an input image into a mezzanine image to which the transformation matrix may be applied before the mezzaine image is converted to a display domain, a display color space, a display manged image, etc.

The transformation matrix can be generated automatically without any involvement of the individual viewer with the set of sample colors comprising a number of separated colors including but not limited to, RGBW colors, up to hundreds of different colors displayable on the reference and target image displays, any subset in a wide range of the most saturated separated colors displayable on both the reference and target image displays, and so forth.

The transformation matrix may be normalized to prevent unwanted clipping or darkening. For example, reference and target image displays may have different peak brightnesses in their respective dynamic ranges. The transformation matrix may be normalized (e.g., to 1, to 1.2, etc.) to avoid generating pixel values with luminance exceeding display capability (e.g., a specific peak luminance, etc.) of the target image display.

Extension to Viewer-specific Compression Optimization

In another embodiment, the concept of a viewer-specific information (such as, a viewer's ColorID) may also be applicable to optimize video compression based on a viewer's visual system. For example, and without limitation, a viewer's contrast sensitivity function (CSF) in combination with his ColorID may be used to identify that the user has a lower sensitivity to contrast (e.g., blurry vision). For this viewer, instead of spending bits on high-frequency details, it may be better to provide a bitstream with lower spatial resolution (or the same spatial resolution but low-pass filtered to remove high frequencies that are not percievable), but with higher compression quality or higher frame rate to achieve an overall improved experience. In such a scenario, the distribution system may either generate a custom bitstream using coding parameters to optimize coding performance for the specific user, or it may select the most appropriate version of the content. For example, in an embodiment, given a viewer's ColorID (which may also incorporate information related to his CSF), the distribution system may consult a look-up table to identify the best encoding parameters, then choose the version that best matches the desired parameters under typical additional constraints, such as a maximum possible bit rate. Viewer-specific compression parameters may include such parameters as: compression quality, spatial resolution, pre- and/or post-filtering, frame rate, shutter angle, bit rate, and the like.

4. Example Process Flows

Figure 4C:
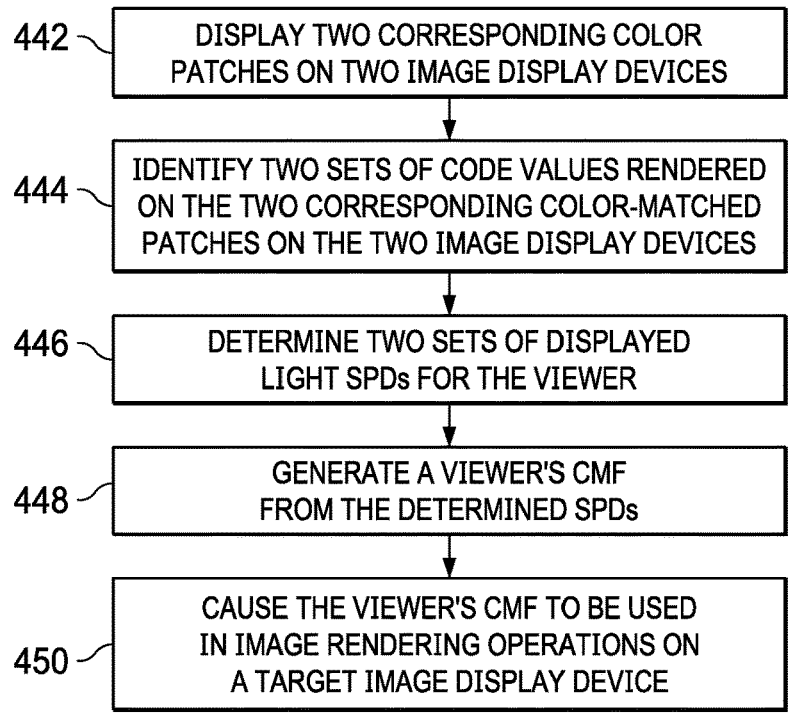

FIG. 4C illustrates an example process flow according to an example embodiment of the present invention. In some example embodiments, one or more computing devices or components may perform this process flow. In block 442, a system (comprising two or more image displays) displays two corresponding color patches on two image displays, the two corresponding color patches being adjusted by a viewer to match visually the two corresponding color patches to a common color as visually perceived by the viewer, two spectral power distributions (SPDs) of the two image displays being different.

In block 444, the system identifies two sets of code values rendered on the two corresponding color patches on the two image displays subsequent to matching visually the two corresponding color patches to the common color.

In block 446, the system determines, based at least in part on the two sets of code values rendered on the two corresponding color patches on the two image displays, two displayed light SPDs for displayed light used to render the two corresponding color patches.

In block 448, the system generates, based at least in part on the two displayed light SPDs, the viewer's color matching function (CMF).

In block 450, the system causes the viewer's CMF to be used in image rendering operations on a target image display.

In an embodiment, the two corresponding color patches visually matched to the common color are initially rendered on the two image displays with an identical pixel value.

In an embodiment, the two corresponding color patches visually matched to the common color are initially rendered on the two image displays with two different pixel values.

In an embodiment, the two corresponding color patches represent a set of two corresponding color patches in a plurality of sets of two corresponding color patches; color patches in each set of two corresponding color patches in the plurality of sets of two corresponding color patches are displayed to the viewer on the two image displays and visually matched to a respective common color in a plurality of colors; the system is further configured to perform:

identifying sets of code values rendered on each set of two corresponding color patches on the two image displays; determining, based at least in part on the sets of code values rendered on each such set of two corresponding color patches on the two image displays, sets of displayed light SPDs for displayed light used to render each such set of two corresponding color patches; generating, based at least in part on the sets of displayed light SPDs, the viewer's CMF.

In an embodiment, at least one of the two image displays represents an image display with metameric instability.

In an embodiment, the two sets of code values are converted from a nonlinear domain to a linear domain; the two sets of code values as converted into the linear domain are used to derive the SPDs of the displayed light.

In an embodiment, the viewer's CMF is generated by minimizing an overall error in matching the viewer's first tristimulus values computed for first color patches on a first image display in the two image displays to the viewer's second tristimulus values computed for second color patches on a second different image display in the two image displays.

In an embodiment, the first tristimulus values are determined by integrating the viewer's CMF with a first spectral power distribution of the two determined spectral power distributions and the second tristimulus values are determined by integrating the viewer's CMF with a second spectral power distribution of the two determined spectral distributions.

In an embodiment, the viewer's CMF comprises three components $\bar{x}$, $\bar{y}$ and $\bar{z}$ and the first tristimulus values are determined by integrating each of the three components with the first spectral power distribution and wherein the second tristimulus values are determined by integrating each of the three components with the second spectral power distribution.

minimizing the overall error comprises using a predetermined initial CMF and iteratively adjusting the CMF until the viewer's first tristimulus values are matched to the second tristimulus values.

In an embodiment, minimizing the overall error comprises using a predetermined initial CMF and iteratively adjusting the CMF until the viewer's first tristimulus values are matched to the second tristimulus values.

In an embodiment, the predetermined initial CMF is a CMF 1931.

In an embodiment, generating the viewer's CMF comprises computing an optimization function. The optimization function comprises a first term and a second term, the first term for matching, by minimizing the overall error, the viewer's first tristimulus values to the viewer's second tristimulus values and the second term for matching either the viewer's first tristimulus values or the viewer's second tristimulus values to the tristimulus values of a standard observer.

In an embodiment, the first term is associated with a first weight and the second term is associated with a second weight smaller than the first weight.

In an embodiment, the viewer's CMF comprises a set of component CMFs for a set of primary colors of a color space; the color space is one of: an RGB color space, a non-RGB color space, an ICtCp color space, a linear color space, a non-linear color space, a perceptually quantized color space, etc.

In an embodiment, the viewer's CMF represents the viewer's color perception identifier specific to the viewer's color perception.

In an embodiment, the method further comprises the step of determining a viewer's individual contrast sensitivity function (CSF) and causing the viewer's CSF to be used in image rendering operations on the target image display.

In an embodiment, the method further comprises adapting video compression parameters for generating a coded bitstream to be delivered to the viewer according to the viewer's CMF and/or the viewer's contrast sensitivity function (CSF).

In an embodiment, the method further comprises selecting a version of a coded bitstream to be delivered to the viewer according to the viewer's CMF and/or the viewer's contrast sensitivity function. The selected version of the coded bitstream is one among a plurality of video coded bitstreams representing the same content but at different coding parameters.

In an embodiment, the viewer's CMF comprises a set of component CMFs for a set of primary colors of a color space.

Figure 4D:
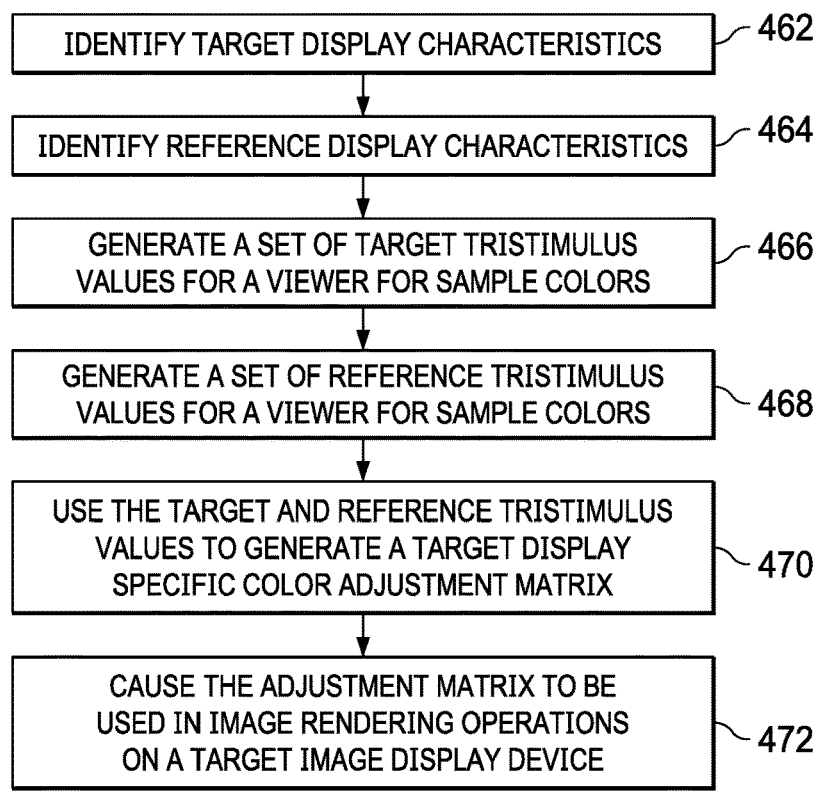

FIG. 4D illustrates an example process flow according to an example embodiment of the present invention. In some example embodiments, one or more computing devices or components may perform this process flow. Block 462 comprises identifying target display characteristics of a target image display, the target display characteristics of the target image display including a target spectral power distribution (SPD) of the target image display.

Block 464 comprises identifying reference display characteristics of a reference image display, the reference display characteristics of the reference image display including a reference SPD of the reference image display.

Block 466 comprises generating a set of target tristimulus values for the viewer for the set of sample colors as represented in the target image display, based at least in part on the target SPD, a set of sample colors and a viewer's color matching function (CMF).

Block 468 comprises generating a set of reference tristimulus values for the viewer for the set of sample colors as represented in the reference image display, based at least in part on the reference SPD, the set of sample colors and a viewer's color matching function (CMF).

Block 470 comprises using the set of target tristimulus values and the set of reference tristimulus values to generate a target display color transformation.

Block 472 comprises causing the target display color transformation to be used in image rendering operations of the target image display.

In an embodiment, the method is performed by one of: a video decoder, a video encoder, a video transcoder, and so forth.

In an embodiment, the method is independently performed by a processing thread for each texture hole pixel in the image.

In various example embodiments, an apparatus, a system, an apparatus, or one or more other computing devices performs any or a part of the foregoing methods as described. In an embodiment, a non-transitory computer readable storage medium stores software instructions, which when executed by one or more processors cause performance of a method as described herein.

Note that, although separate embodiments are discussed herein, any combination of embodiments and/or partial embodiments discussed herein may be combined to form further embodiments.

5. Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
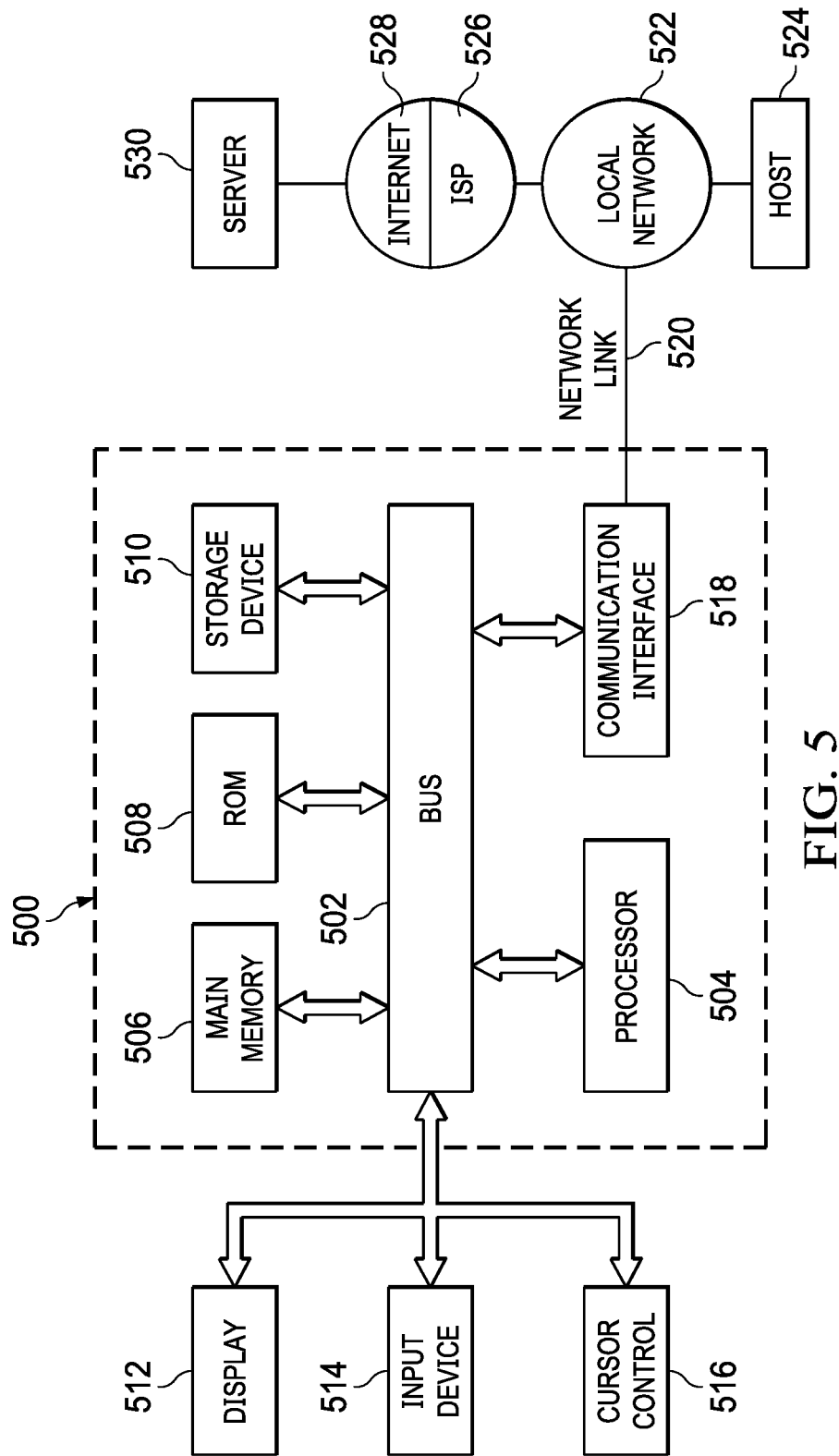
FIG. 5 illustrates an example hardware platform on which a computer or a computing device as described herein may be implemented.

For example, FIG. 5 is a block diagram that illustrates a computer system 500 upon which an example embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504.

A storage device 510, such as a magnetic disk or optical disk, solid state RAM, is provided and coupled to bus 502 for storing information and instructions.

Computer system 500 may be coupled via bus 502 to a display 512, such as a liquid crystal display, for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams.

The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

6. Equivalents, Extensions, Alternatives and Miscellaneous

In the foregoing specification, example embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

ENUMERATED EXEMPLARY EMBODIMENTS

The invention may be embodied in any of the forms described herein, including, but not limited to the following Enumerated Example Embodiments (EEEs) which describe structure, features, and functionality of some portions of the present invention.

EEEA1. A method for determining viewers' individual color matching functions, the method comprising:
displaying two corresponding color patches on two image displays, the two corresponding color patches being adjusted by a viewer to match visually the two corresponding color patches to a common color as visually perceived by the viewer, two spectral power distributions (SPDs) of the two image displays being different;
subsequent to matching visually the two corresponding color patches to the common color, performing:
identifying two sets of code values rendered on the two corresponding color patches on the two image displays;
determining, based at least in part on the two sets of code values rendered on the two corresponding color patches on the two image displays, two displayed light SPDs for displayed light used to render the two corresponding color patches;
generating, based at least in part on the two displayed light SPDs, the viewer's color matching function (CMF);
causing the viewer's CMF to be used in image rendering operations on a target image display.

EEEA2. The method of EEEA1, wherein the two corresponding color patches visually matched to the common color are initially rendered on the two image displays with an identical pixel value.

EEEA3. The method of EEEA1 or EEEA2, wherein the two corresponding color patches visually matched to the common color are initially rendered on the two image displays with two different pixel values.

EEEA4. The method of any of EEEA1-EEEA3, wherein the two corresponding color patches represent a set of two corresponding color patches in a plurality of sets of two corresponding color patches; wherein color patches in each set of two corresponding color patches in the plurality of sets of two corresponding color patches are displayed to the viewer on the two image displays and visually matched to a respective common color in a plurality of colors; the method further comprising:
identifying sets of code values rendered on each set of two corresponding color patches on the two image displays;
determining, based at least in part on the sets of code values rendered on each such set of two corresponding color patches on the two image displays, sets of displayed light SPDs for displayed light used to render each such set of two corresponding color patches;
generating, based at least in part on the sets of displayed light SPDs, the viewer's CMF.

EEEA5. The method of any EEEA1 to EEEA4, wherein at least one of the two image displays represents an image display with metameric instability.

EEEA6. The method of any EEEA1 to EEEA5, wherein the two sets of code values are converted from a nonlinear domain to a linear domain; wherein the two sets of code values as converted into the linear domain are used to derive the SPDs of the displayed light.

EEEA7. The method of EEEA1 to EEEA6, wherein the viewer's CMF is generated by minimizing an overall error in matching the viewer's first tristimulus values computed for first color patches on a first image display in the two image displays to the viewer's second tristimulus values computed for second color patches on a second different image display in the two image displays.

EEEA8. The method of any EEEA1 to EEEA7, wherein the viewer's CMF comprises a set of component CMFs for a set of primary colors of a color space; wherein the color space is one of: an RGB color space, a non-RGB color space, an ICtCp color space, a linear color space, a non-linear color space, a perceptually quantized color space, etc.

EEEA9. The method of any EEEA1 to EEEA8, wherein the viewer's CMF represents the viewer's color perception identifier specific to the viewer's color perception.

EEEA10. The method of any EEEA1 to EEEA9, wherein the viewer's CMF comprises a set of component CMFs for a set of primary colors of a color space.

EEEA11. A method for determining target display specific color adjustments, the method comprising:
identifying target display characteristics of a target image display, the target display characteristics of the target image display including a target spectral power distribution (SPD) of the target image display;
identifying reference display characteristics of a reference image display, the reference display characteristics of the reference image display including a reference SPD of the reference image display;
based at least in part on the target SPD, a set of sample colors and a viewer's color matching function (CMF), generating a set of target tristimulus values for the viewer for the set of sample colors as represented in the target image display;

based at least in part on the reference SPD, the set of sample colors and a viewer's color matching function (CMF), generating a set of reference tristimulus values for the viewer for the set of sample colors as represented in the reference image display;

using the set of target tristimulus values and the set of reference tristimulus values to generate a target display color transformation;

causing the target display color transformation to be used in image rendering operations of the target image display.

EEEA12. An apparatus performing any of the methods as recited in any of the EEEA1 to EEEA 11.

EEEA13. A system performing any of the methods as recited in any of the EEEA1 to EEEA11.

EEEA14. A non-transitory computer readable storage medium, storing software instructions, which when executed by one or more processors cause performance of the method recited in any of EEEA1 to EEEA11.

EEEA15. A computing device comprising one or more processors and one or more storage media, storing a set of instructions, which when executed by one or more processors cause performance of the method recited in any of EEEA1 to EEEA11.

EEEB1. A method for determining viewers' individual color matching functions, the method comprising:

displaying two corresponding color patches on two image displays, the two corresponding color patches being adjusted by a viewer to match visually the two corresponding color patches to a common color as visually perceived by the viewer, two spectral power distributions (SPDs) of the two image displays being different;

subsequent to matching visually the two corresponding color patches to the common color, performing:
  identifying two sets of code values rendered on the two corresponding color patches on the two image displays;
  determining, based at least in part on the two sets of code values rendered on the two corresponding color patches on the two image displays, two displayed light SPDs for displayed light used to render the two corresponding color patches;
  generating, based at least in part on the two displayed light SPDs, the viewer's color matching function (CMF);

causing the viewer's CMF to be used in image rendering operations on a target image display.

EEEB2. The method of EEEB1, wherein the two corresponding color patches visually matched to the common color are initially rendered on the two image displays with an identical pixel value.

EEEB3. The method of EEEB1, wherein the two corresponding color patches visually matched to the common color are initially rendered on the two image displays with two different pixel values.

EEEB4.The method of EEEB1, wherein the two corresponding color patches represent a set of two corresponding color patches in a plurality of sets of two corresponding color patches; wherein color patches in each set of two corresponding color patches in the plurality of sets of two corresponding color patches are displayed to the viewer on the two image displays and visually matched to a respective common color in a plurality of colors; the method further comprising:
  identifying sets of code values rendered on each set of two corresponding color patches on the two image displays;
  determining, based at least in part on the sets of code values rendered on each such set of two corresponding color patches on the two image displays, sets of displayed light SPDs for displayed light used to render each such set of two corresponding color patches;
  generating, based at least in part on the sets of displayed light SPDs, the viewer's CMF.

EEEB5. The method of EEEB1, wherein at least one of the two image displays represents an image display with metameric instability.

EEEB6. The method of EEEB1, wherein the two sets of code values are converted from a nonlinear domain to a linear domain; wherein the two sets of code values as converted into the linear domain are used to derive the SPDs of the displayed light.

EEEB7. The method of EEEB1, wherein the viewer's CMF is generated by minimizing an overall error in matching the viewer's first tristimulus values computed for first color patches on a first image display in the two image displays to the viewer's second tristimulus values computed for second color patches on a second different image display in the two image displays.

EEEB8. The method of EEEB1, wherein the viewer's CMF comprises a set of component CMFs for a set of primary colors of a color space; wherein the color space is one of: an RGB color space, a non-RGB color space, an ICtCp color space, a linear color space, a non-linear color space, or a perceptually quantized color space.

EEEB 9. The method of EEEB1, wherein the viewer's CMF represents the viewer's color perception identifier specific to the viewer's color perception.

EEEB10. The method of EEEB1, wherein the viewer's CMF comprises a set of component CMFs for a set of primary colors of a color space.

EEEB11. The method of EEEB1, further comprising the step of determining a viewer's individual color sensitivity function (CSF) and causing the viewer's CSF to be used in image rendering operations on a target image display.

EEEB12. The method of EEEB1, further comprising a video distribution system adapting video compression parameters for generating a coded bitstream to be delivered to the viewer according to the viewer's CMF and/or the viewer's contrast sensitivity function.

EEEB13. The method of EEEB1, further comprising a video distribution system selecting a version of a coded bitstream to be delivered to the viewer according to the viewer's CMF and/or the viewer's contrast sensitivity function, wherein the selected version of the coded bitstream is one among a plurality of video coded bitstreams representing the same content but at different coding parameters.

EEEB14. A method for determining target display specific color adjustments, the method comprising:
  identifying target display characteristics of a target image display, the target display characteristics of the target image display including a target spectral power distribution (SPD) of the target image display;
  identifying reference display characteristics of a reference image display, the reference display characteristics of the reference image display including a reference SPD of the reference image display;

based at least in part on the target SPD, a set of sample colors and a viewer's color matching function (CMF), generating a set of target tristimulus values for the viewer for the set of sample colors as represented in the target image display;

based at least in part on the reference SPD, the set of sample colors and a viewer's color matching function (CMF), generating a set of reference tristimulus values for the viewer for the set of sample colors as represented in the reference image display;

using the set of target tristimulus values and the set of reference tristimulus values to generate a target display color transformation;

causing the target display color transformation to be used in image rendering operations of the target image display.

EEEB15. An apparatus performing any one of the methods as recited in EEEBs 1-12.

EEEB16. A system performing any one of the methods as recited in EEEBs 1-12.

EEEB17. A non-transitory computer readable storage medium, storing software instructions, which when executed by one or more processors cause performance of the method recited in any one of EEEBs 1-12.

EEEB18. A computing device comprising one or more processors and one or more storage media, storing a set of instructions, which when executed by one or more processors cause performance of the method recited in any one of EEEBs 1-12.

The invention claimed is:

1. A method for determining viewers' individual color matching functions, the method comprising:

selecting two image displays having different spectral power distributions, the spectral power distribution of each of the two image displays representing the power radiated by the image display at wavelengths of the visible spectrum, displaying two corresponding color patches on the two image displays, at least one of the two corresponding color patches being adjusted by a viewer to match visually the two corresponding color patches to a common color as visually perceived by the viewer;

subsequent to matching visually the two corresponding color patches to the common color, performing:
identifying two sets of code values rendered on the two corresponding color patches on the two image displays;
determining, based at least in part on the identified two sets of code values, two spectral power distributions of light displayed on the two image displays used to render the two corresponding color patches;
generating, based at least in part on the determined two spectral power distributions, the viewer's color matching function (CMF);

causing the viewer's CMF to be used in image rendering operations on a target image display.

2. The method of claim 1, wherein the two color patches visually matched to the common color are initially rendered on the two image displays with an identical pixel value.

3. The method of claim 1, wherein the two color patches visually matched to the common color are initially rendered on the two image displays with two different pixel values.

4. The method of claim 1, wherein the two color patches represent a set of two corresponding color patches in a plurality of sets of two corresponding color patches; wherein color patches in each set are displayed to the viewer on the two image displays and visually matched to a respective common color in a plurality of colors; the method further comprising:
identifying sets of code values rendered on each set of two corresponding color patches on the two image displays;
determining, based at least in part on the sets of code values rendered on each such set of two corresponding color patches on the two image displays, sets of spectral power distributions of light displayed on the two image displays used to render each such set of two corresponding color patches; and
generating, based at least in part on the sets of displayed light SPDs, the viewer's CMF.

5. The method of claim 1, wherein the two sets of code values are converted from a nonlinear domain to a linear domain; wherein the two sets of code values as converted into the linear domain are used to derive the SPDs of the displayed light.

6. The method of claim 1, wherein the viewer's CMF is generated by minimizing an overall error in matching the viewer's first tristimulus values computed for first color patches on a first image display of the two image displays to the viewer's second tristimulus values computed for second color patches on a second image display of the two image displays.

7. The method of claim 6, wherein the first tristimulus values are determined by integrating the viewer's CMF with a first spectral power distribution of the two determined spectral power distributions and wherein the second tristimulus values are determined by integrating the viewer's CMF with a second spectral power distribution of the two determined spectral distributions.

8. The method of claim 7, wherein the viewer's CMF comprises three components $\bar{x}$, $\bar{y}$ and $\bar{z}$ and wherein the first tristimulus values are determined by integrating each of the three components with the first spectral power distribution and wherein the second tristimulus values are determined by integrating each of the three components with the second spectral power distribution.

9. The method according to claim 6, wherein minimizing the overall error comprises using a predetermined initial CMF and iteratively adjusting the CMF until the viewer's first tristimulus values are matched to the second tristimulus values.

10. The method according to claim 9, wherein the predetermined initial CMF is a CIE 1931 CMF.

11. The method according to claim 6, wherein generating the viewer's CMF comprises computing an optimization function, wherein the optimization function comprises a first term and a second term, the first term for matching, by minimizing the overall error, the viewer's first tristimulus values to the viewer's second tristimulus values and the second term for matching either the viewer's first tristimulus values or the viewer's second tristimulus values to the tristimulus values of a standard observer.

12. The method of claim 11, wherein the first term is associated with a first weight and the second term is associated with a second weight smaller than the first weight.

13. The method of claim 1, wherein the viewer's CMF comprises a set of component CMFs for a set of primary colors of a color space.

14. The method of claim 13, wherein the color space is one of: an RGB color space, a non-RGB color space, an ICtCp color space, a linear color space, a non-linear color space, or a perceptually quantized color space.

15. The method of claim 1, wherein the viewer's CMF represents the viewer's color perception identifier specific to the viewer's color perception.

16. The method of claim 1, further comprising the step of determining a viewer's individual contrast sensitivity function (CSF) and causing the viewer's CSF to be used in image rendering operations on the target image display.

17. The method of claim 16, further comprising adapting video compression parameters for generating a coded bitstream to be delivered to the viewer according to the viewer's CMF and/or the viewer's contrast sensitivity function (CSF).

18. The method of claim 16, further comprising selecting a version of a coded bitstream to be delivered to the viewer according to the viewer's CMF and/or the viewer's contrast sensitivity function, wherein the selected version of the coded bitstream is one among a plurality of video coded bitstreams representing the same content but at different coding parameters.

19. An apparatus configured to perform the method as recited in claim 1.

20. A non-transitory computer readable storage medium, storing software instructions, which when executed by one or more processors cause performance of the method recited in claim 1.

21. A method for determining target display specific color adjustments, the method comprising:

identifying target display characteristics of a target image display, the target display characteristics of the target image display including a target spectral power distribution (SPD) of the target image display;

identifying reference display characteristics of a reference image display, the reference display characteristics of the reference image display including a reference SPD of the reference image display;

based at least in part on the target SPD, a set of sample colors and the viewer's color matching function (CMF) as determined with the method of claim 1, generating a set of target tristimulus values for the viewer for the set of sample colors as represented in the target image display;

based at least in part on the reference SPD, the set of sample colors and the viewer's color matching function (CMF), generating a set of reference tristimulus values for the viewer for the set of sample colors as represented in the reference image display;

generate a target display color transformation to transform the set of reference tristimulus values to the set of target tristimulus values; and causing the target display color transformation to be used in image rendering operations of the target image display.

22. The method of claim 21, wherein the set of sample colors comprises one or more saturated colors and a specific white color.

* * * * *